United States Patent
Weinberg et al.

(10) Patent No.: US 6,571,630 B1
(45) Date of Patent: Jun. 3, 2003

(54) DYNAMICALLY BALANCED MICROELECTROMECHANICAL DEVICES

(75) Inventors: Marc S. Weinberg, Needham, MA (US); Kaplesh Kumar, Wellesley, MA (US); A. Thomas King, Medway, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 09/937,268

(22) PCT Filed: Mar. 23, 2000

(86) PCT No.: PCT/US00/07756
§ 371 (c)(1),
(2), (4) Date: Jul. 9, 2002

(87) PCT Pub. No.: WO00/57194
PCT Pub. Date: Sep. 28, 2000

Related U.S. Application Data
(60) Provisional application No. 60/126,205, filed on Mar. 25, 1999.

(51) Int. Cl.[7] ............................. G01P 9/04; B23K 26/02
(52) U.S. Cl. ................. 73/504.16; 73/1.37; 219/121.69
(58) Field of Search .......................... 73/504.16, 504.12, 73/1.37; 438/50, 51, 52; 219/121.69, 121.6, 121.66, 121.68

(56) References Cited

U.S. PATENT DOCUMENTS

| | | | |
|---|---|---|---|
| 3,766,616 A | 10/1973 | Staudte | 29/25.35 |
| 5,522,249 A | 6/1996 | Macy | 73/1.37 |
| 5,723,788 A | 3/1998 | Terada et al. | 73/504.16 |
| 5,866,816 A | 2/1999 | Hulsing, II | 73/504.16 |
| 5,945,599 A | 8/1999 | Fujiyoshi et al. | 73/504.12 |

*Primary Examiner*—John E. Chapman
(74) *Attorney, Agent, or Firm*—Weingarten, Schurgin, Gagnebin & Lebovici LLP (57) ABSTRACT

Dynamic balancing reduces quadrature bias in microfabricated vibrating instruments such as tuning fork gyros so that a purity of motion is achieved in the absence of any angular rate input. Balancing is achieved by ablating (74) or depositing (72) onto support structure (62) for a tuning fork gyroscope rather than the proof mass (60) itself by melting and moving material on a tuning fork beam (62). Such adjusting is advantageously done during actual operation of the gyro by laser beam application through an encapsulating transparent cover which can be either part of the chip die or an external package.

17 Claims, 6 Drawing Sheets

DYNAMICALLY BALANCED MICROELECTROMECHANICAL DEVICES

CROSS REFERENCE TO RELATED APPLICATIONS

This application claims priority under 35 U.S.C. §119(e) to U.S. Provisional Patent Application No. 60/126,205, filed Mar. 25, 1999, entitled DYNAMICALLY BALANCED MICROELECTROMECHANICAL DEVICES.

STATEMENT REGARDING FEDERALLY SPONSORED RESEARCH OR DEVELOPMENT

BACKGROUND OF THE INVENTION

If the principal area moments of the suspension beams of a tuning fork gyro are not aligned with the drive force, drive force or motion will result in sense axis (Y axis) motion which will be interpreted as input rate. This can be reduced by dynamically balancing the device.

Traditionally, dynamic balancing of macro-sized translating or rotating structures have involved the physical attachment of masses, such as metal pieces on the rims of automobile tires, by mechanical fastening or adhesive techniques. These procedures are impractical when dealing with miniaturized vibrating structures.

In miniaturized-scale devices, the focus has been mostly on controlling the resonant frequency, as with the quartz crystal tuning forks in the watch industry. The timekeeping mechanism in a quartz watch is the quartz crystal, shaped in the form of a conventional tuning fork. Quartz watches are very stable because the resonant frequencies of the crystals are extremely stable. Parts costing less than a dollar each, experience typical frequency shifts of about a few parts in $10^7$ over the course of a month. In production, the as-fabricated resonant frequencies of the quartz crystals are somewhat variable due to inadequate process control. The small frequency deviations from the norm are corrected later by laser ablating controlled amounts of metal (typically gold) that is pre-deposited on the tips of the tuning fork tines. Only the mass of the tines is affected; little change in geometry and the stiffness of the vibrating structure results from this operation. The change in mass manifests itself as a change in the tuning fork's resonant frequency.

Others have dynamically balanced quartz tuning fork gyros through the tedious process of having an operator place small epoxy dabs as masses on the vibrating members. The process is neither practical for the order of magnitude smaller silicon microstructures nor cost effective.

BRIEF SUMMARY OF THE INVENTION

According to the teaching of the present invention a tuning fork gyro is balanced in the true dynamic sense, even as the tuning forks continue to vibrate. Real time balancing and quadrature bias reduction are, thus, achieved.

The present tuning fork gyro, as shown for example in copending and commonly owned U.S. Pat. Nos.: 5,349,855; 5,388,458; 5,496,436; 5,767,404; 5,892,153; 5,952,574, in a preferred embodiment consists of two silicon mass structures suspended with two folded beam structures. The flexures ensure that the tuning fork anti-parallel mode is excited and that the translational modes are attenuated. The combs are excited so that electrostatic forces are generated which only weakly depend on the lateral position of the masses. The resulting large amplitude vibrations, parallel to the teeth, increase gyro sensitivity and reduce errors from external forces such as Brownian motion. When the device is rotated about its input axis (which is coincident with the sense axis and is in the plane of the substrate), Coriolis forces push one mass up and the other down. Capacitor plates below the proof masses are used for sensing this displacement. The differential capacitance measured for the two proof masses is related to the input angular rate.

The gyro output signal, proportional to input rate, is in-phase with the velocity of $[2\vec{\omega} \times \vec{v}]$ the proof masses. The Coriolis acceleration, where $\omega$ is the input rotation rate and v is the velocity, and, thus, the Coriolis force is a maximum where the velocity is the maximum. The maximum velocity position during operation corresponds with the neutral at-rest position of the tines in their unexcited state. With the tines resonating, the out-of plane displacements from angular rate inputs are a maximum at this position. Constant input rate results in vertical proof mass motion and sense axis differential capacitance at the drive frequency in-phase with the drive velocity. The differential capacitance and the output voltage also contain signals in phase with the drive position and in quadrature with the desired input rate information. The major source of quadrature signal is proof mass vertical motion caused by the suspension beams' principal area moment of inertia not being aligned with the drive forces. Since gyroscopes are generally operated at resonance in vacuum, the spring forces and quadrature signals are larger than the forces to drive the proof mass.

The quadrature bias signal has been typically quite large; it is generally considerably larger than the in-phase gyro bias signal. The magnitude and stability of the quadrature bias are both of concern because they corrupt the measurement of the actual input rate. The aim of the balancing task is to reduce the quadrature bias signal to a level, below the in-phase bias signal.

This is achieved by the use of laser ablation or deposition in a substantially vacuum environment, including the vacuum packaged finished gyro. Additionally, material that has been laser melted can be moved to affect balancing. The ablation deposition, or moving of material can occur during operation, typically with the vibrating elements at maximum velocity at the near neutral position rather than at motional extremes. The material ablation or addition occurs in the support structures for the device rather than on the proof masses, because the effect of changes are greater on the quadrature signal at those points.

DETAILED DESCRIPTION OF THE INVENTION

In the tuning fork gyro, quadrature is most sensitive to coupling of drive force to sense motion through the misalignment of the suspension beam principal axes with the drive force defined by the combs. The sensitivity of quadrature to beam area cross moments (beam asymmetry) is large while the sensitivity to mass deposited on the proof masses is relatively small.

Theoretical considerations of the source of these errors and their corrections are presented in the Appendices A, B, and C. Appendix A considers a gyro with perfect mass distribution but support beams of irregular cross section. Appendices B and C consider situations where the centers of mass and beam suspension do not coincide. Conclusions based on these analyses are that the quadrature is much more sensitive to area cross product of inertia (irregular cross section) than to the mass displacement effects. Appendix C also indicates that severe curling can contribute to the quadrature error.

If deformed, curling of the proof masses may dominate mass unbalance but is normally less significant than the area cross products. Electrical effects also contribute to quadrature.

Figure 1:
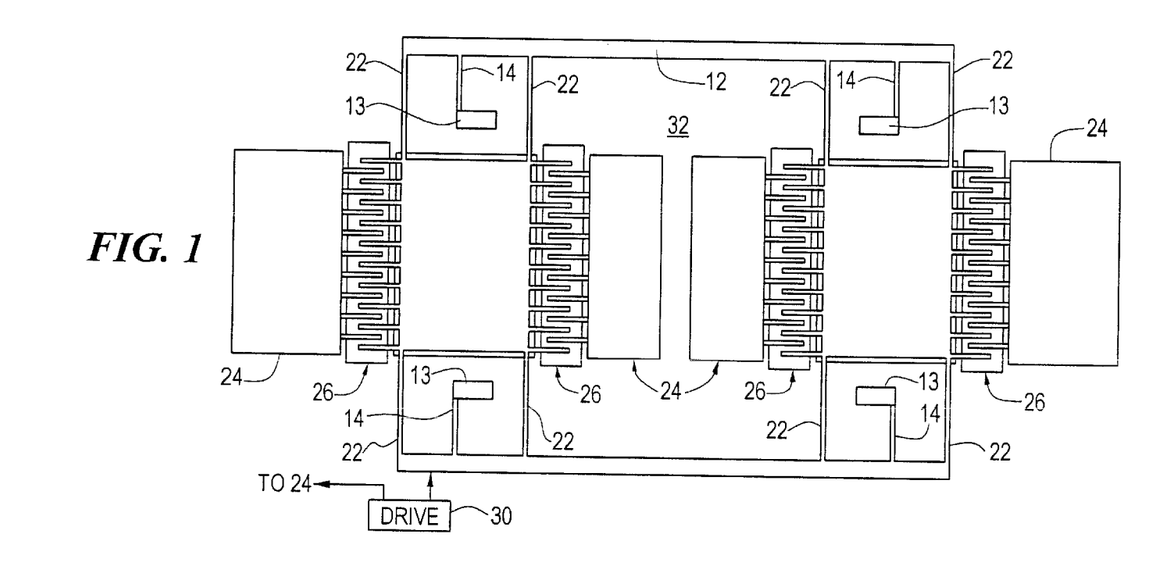
FIGS. 1 and 1[1] are respective top and end view is a diagram of a basic tuning fork gyroscope illustrating the present invention.

Referring to FIGS. 1 and 1¹, if the principal area moments of the suspension beams are not aligned with the drive force, normally in the "X" direction drive force or motion will result in sense axis (Y axis) motion which will be interpreted as input rate. Four equivalent situations are shown in FIGS. 1a–d for the structure of FIGS. 1 and 1¹. As shown if FIGS. 1 and 1¹, a frame 12 is supported by four tension beam flexures 14 from four struts 13 anchored to substrates 2 about an input axis 16. First and second proof masses 20 are suspended on beams 22 from frame 12, and driven in the "X" direction from electrodes 24, typically through interdigitated comb drive electrodes 26 by a drive source 30. All the above elements are typically formed of silicon by micromachining techniques known in the art. Sense electrodes 28 are located on a silicon substrate 32 below the proof mass 20 to sense through the change in capacitance there between the "Y" motions of the masses 20 and its integral. A sense electronics and demodulator 36 uses the drive position to detect by demodulation the in phase and quadrature components of the signal representing sense axis displacement. The in phase component is the sense signal in phase with the then driven X axis velocity. The in phase contains the desired angular rate information. The Quadrature component is electrically at 90° with respect to the proof mass velocity. The demodulation of the sense electrodes' signals separates in phase and quadrature signals on separate outputs from electronics 36. A component reflecting the imbalance of the vibrating masses 20 and beams 22 in the quadrature component is difficult to completely isolate in the demodulation process, limiting accuracy and AC gain.

Figure 1A:
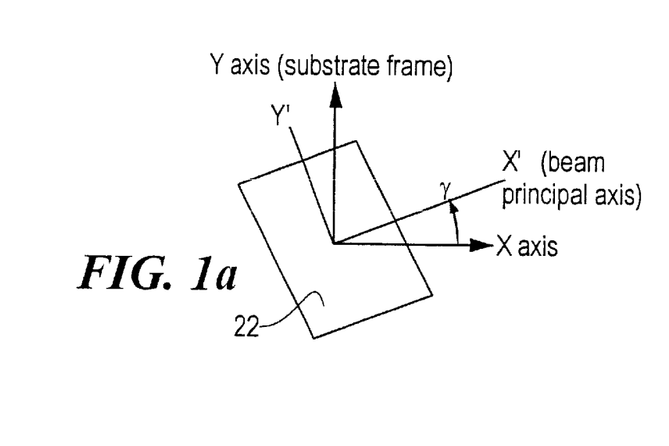
FIGS. 1*a*–1*d* are cross sectional views of beams of a gyro of FIG. 1 illustrating the principal mechanism of quadrature bias error needing balancing out.
Figure 1B:
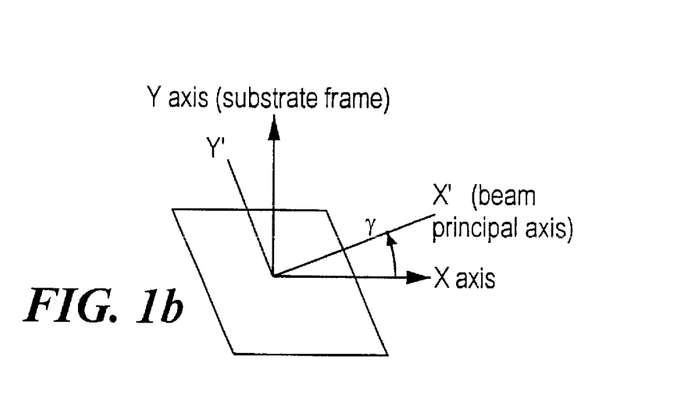
Figure 1C:
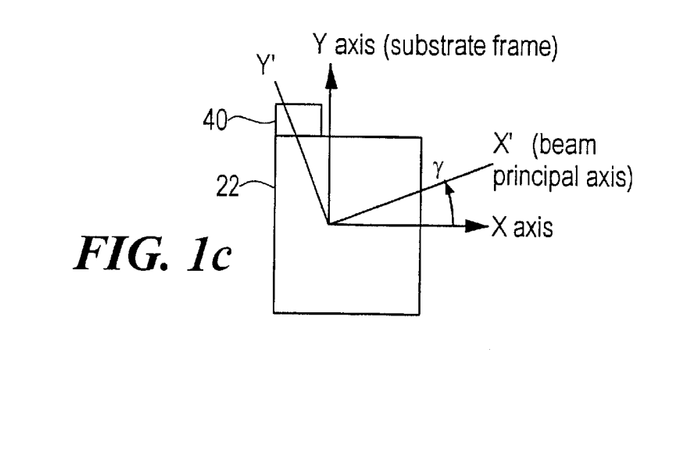
Figure 1D:
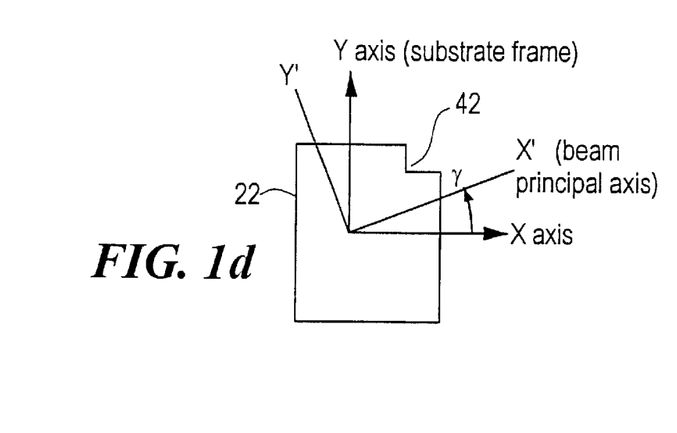
Figure 2A:
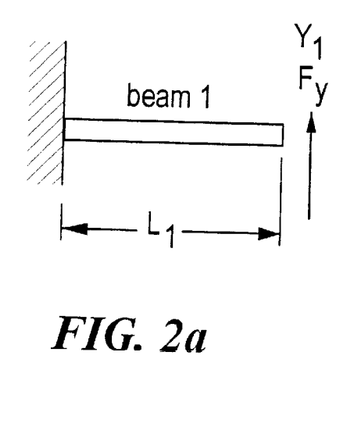
FIGS. 2*a*–2*d* are views of support beams useful in understanding the invention.
Figure 2B:
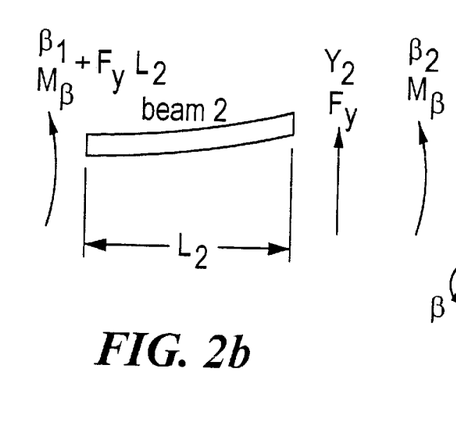
Figure 2C:
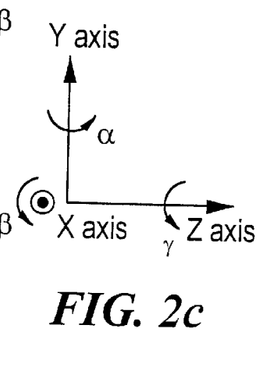
Figure 2D:
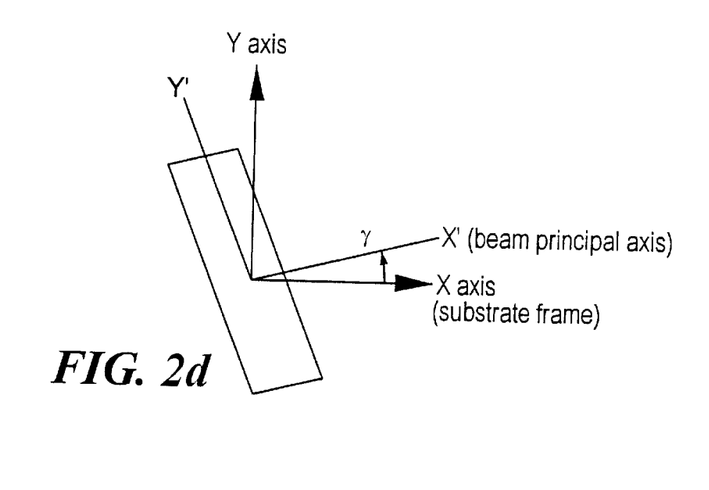

If the drive force is aligned with the X axis in the substrate frame and if a rectangular beam 22 for the masses 20 is rotated as shown in FIG. 1a, motion along the +X axis will also cause +Y motion when the sense resonant frequency, the frequency of resonance of the sense circuit dynamics, is higher than the drive frequency. If the drive frequency is greater than the sense resonance, another 180° phase enters so that +X motion gives −Y coupling. Since the Y motion is in-phase with the X motion, a quadrature bias is seen if the beams supporting the two proof masses are similarly rotated.

The four cross sections shown in FIGS. 1a–d are equivalent in that all have cross product of inertia $I_{xy}$ less than zero.

As indicated, deposition 40 or removal 42 of area (FIGS. 1c and 1d) can be used to offset beam rotation (FIG. 1a) or parallelograms (FIG. 1b), as described in Appendix A.1.

Testing of tuning fork gyro yields quadrature biases typically of 50 to 500 rad/s. When the gyro scale factor is accounted for, this quadrature is independent of pressure or drive amplitude. A very plausible source of this quadrature is parallelogram beam cross sections (FIG. 1b) where angles of only 0.0005 radians explain the observed effects.

Because of the beam coupling, an x displacement (drive) results in a y (sense) motion. The coupling is related to a quadrature error. For one proof mass, the vertical force $F_y$ associated with a displacement y is $k_y Y$ where $k_y$ is the vertical spring stiffness. A perceived rate error is related to vertical force by:

$$\hat{\Omega} = \frac{F_y}{2m\omega_d x} = \frac{k_y y}{2m\omega_d x} = \frac{\omega_s^2 y}{2\omega_d x} \tag{1}$$

where m=proof mass $107_d$=drive axis resonant frequency.

$107_s$=sense axis resonant frequency.

Since the sense and drive resonant frequencies are close (design goal 5% separation), (1) is simplified to:

$$\hat{\Omega} \approx \frac{\omega_d y}{2x} \tag{2}$$

For beam coupling, y is in phase (or 180° of phase) with x so that the perceived error is quadrature. For a known drive amplitude, the rate equivalent quadrature depends on the ratio y/x; that is, the quadrature in angular rate does not depend on the actual gyro scale factor.

To study the impact of cross products of inertia, the beam model of FIGS. 2a–2d is referenced.

1. Each beam is made of two sections which can have differing cross sections (area inertia).

2. The left end is built in, a reasonable assumption for the proof mass end of the beams. Where the beams contact the base, the boundary conditions should really include the folded in beam. Solutions are obtained for the right end either built-in or free. When calculating the drive resonant frequencies reasonable agreement is obtained by assuming both ends are built-in. Poorer agreement is obtained for the sense resonance.

3. No beam mass is assumed so that static analysis is valid.

Square cross section beams do not greatly reduce the angle tolerances to restrict parallelogram cross sections. For a given angle parallelogram, the quadrature is proportional to the beam thickness squared. Square beams help if the beams are rotated with respect to the force axes.

For a tuning fork gyro with beam width of 3.5 $\mu$m and thickness of 4.8 $\mu$m, a taper angle of 0.47 mrad results in the beam's 22 principal axes being rotated 1 mrad. With both or one end built-in, y/x is $4.7 \times 10^{-4}$ and corresponds to a quadrature of 50 rad/s; thus, beam asymmetry is a major source of quadrature.

Figure 3:
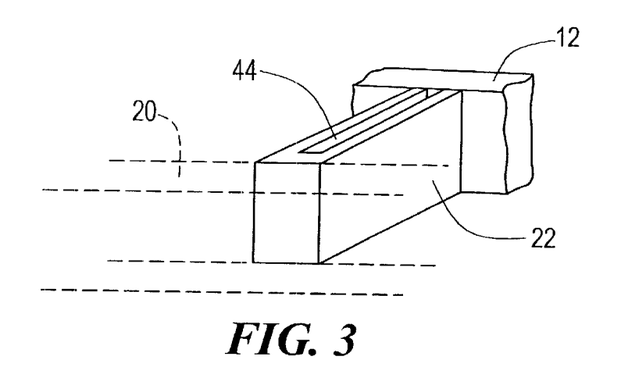
FIG. 3 is a perspective view illustrating beam depositions.
Figure 7:
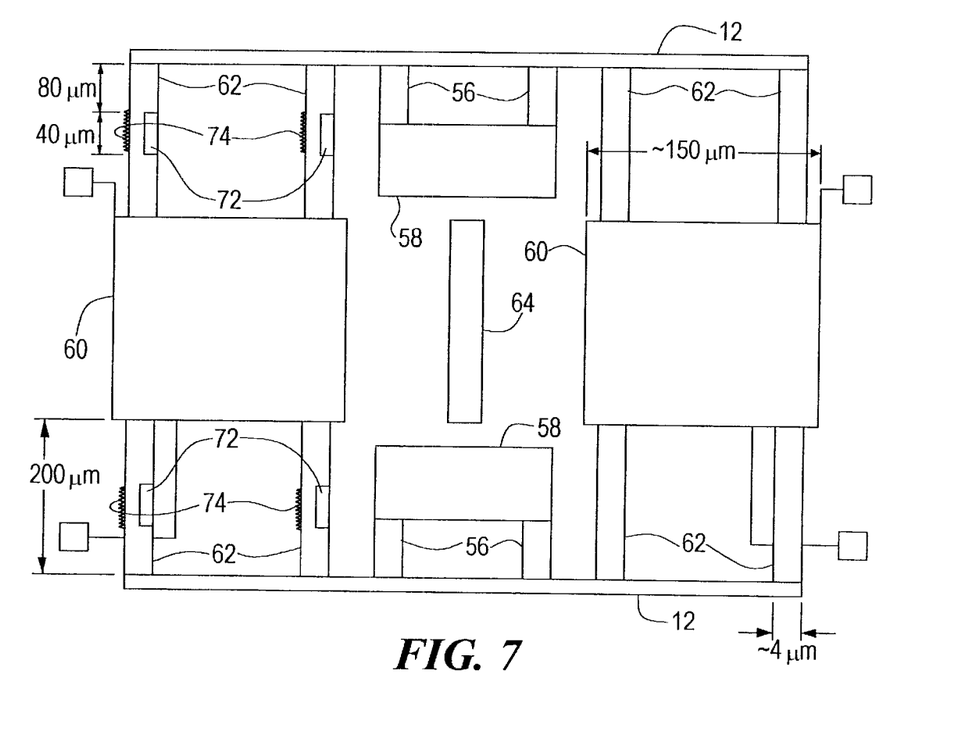
FIG. 7 illustrates the balancing of the gyro of FIG. 6 by the process of deposition or ablation.

FIG. 7 shows the beams 62 of the gyro in FIGS. 1 and 1¹ in relative isolation. As shown in FIG. 3, material is deposited, removed, or shifted from the corner of the beams. Material can be removed from one or any number of beams. As shown, ablation on one edge raises the quadrature while ablation on the other edge reduces the quadrature. The quadrature is most sensitive to material removal from positions where the beam's bending moment is high. With built-in beams, maximum effect is achieved at the ends and a smaller effect near the center (Appendix A.2). Because the beam ends away from the proof mass do not move, trimming is done while the gyroscope is vibrating as discussed below.

To obtain or reduce differential quadrature, the suspension beams on both right and left proof masses must slope in the same direction since the mass velocities are opposing. To restate, differential quadrature is reduced (or made larger) by trimming the right (for example) edge of any beam attached to the proof mass. The correlation of edge to quadrature increase or decrease, as indicated by the associated electronics 36 is fixed and easily determined. For a given electronics 36, the correct edge is always determined by the sign of the quadrature.

Because of nonlinear stiffening in the beam suspension, the quadrature is affected by the drive amplitude; therefore, trimming should be done at the amplitude where the instrument is intended to operate.

Figure 6:
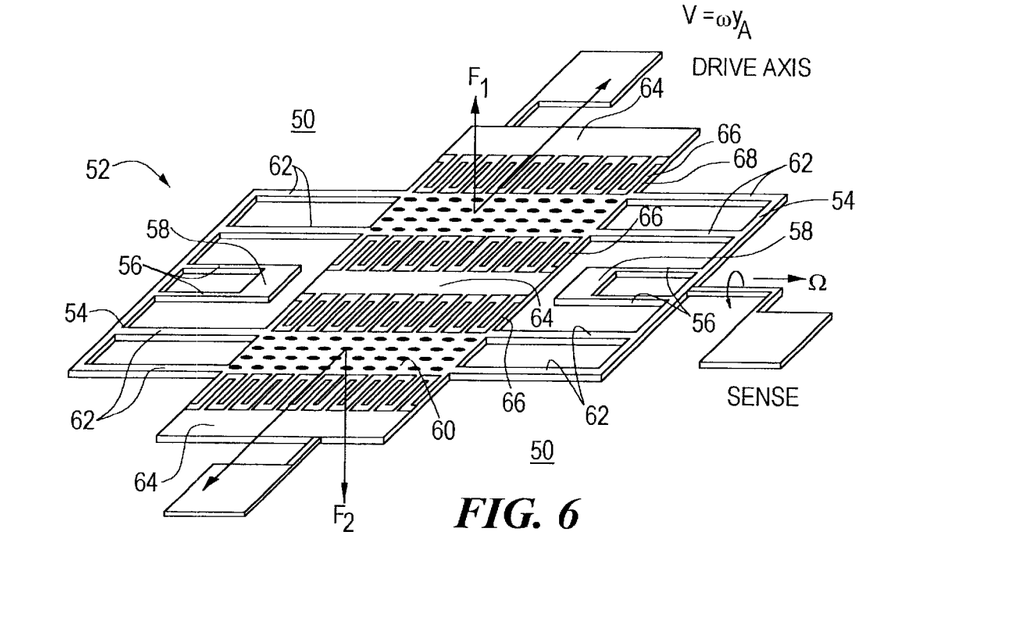
FIG. 6 illustrates a preferred form of the tuning fork gyro for use in the invention.

A preferred form of tuning fork gyro is shown in FIG. 6 illustrating the micro machined and/or suspended silicon components 52 formed above the remains of a substrate 50 using techniques known in the art. The gyro includes a frame 54 of parallel silicon strips supported by two flexures 56 each from pedestals 58 attached to the substrate 50 by not being freed therefrom during the manufacturing processes. The frames 54 support proof masses 60 from flexure beams 62. The proof masses are driven by electrodes 64 fixed to substrate 50 through interdigitated sets of drive electrodes 66 attached to both the proof masses 60 and the electrodes 64. Sense electrodes 68 are positioned below the proof masses 60 to control fluid and damping effects.

In FIG. 7 the beams 62 of the gyro of FIG. 6 are shown in relative isolation. As shown there, depositions 72 are made on the four beams 62 that support one of the proof masses 60 on one edge in order to effect the area cross product of inertial that affect the quadrature bias. The deposition is shown central where it is of least effect at the inflection point for maximum resolution in the process, but need not be so limited. Ablations in the opposite side region 74 could be used alternatively or additionally to achieve the same effect.

The present techniques for trimming quadrature are described. Ablation or material shift for trimming is accomplished by using the apparatus of FIG. 8. Similar equipment, available commercially, is used to deposit material, an alternative trimming technique.

Figure 8:
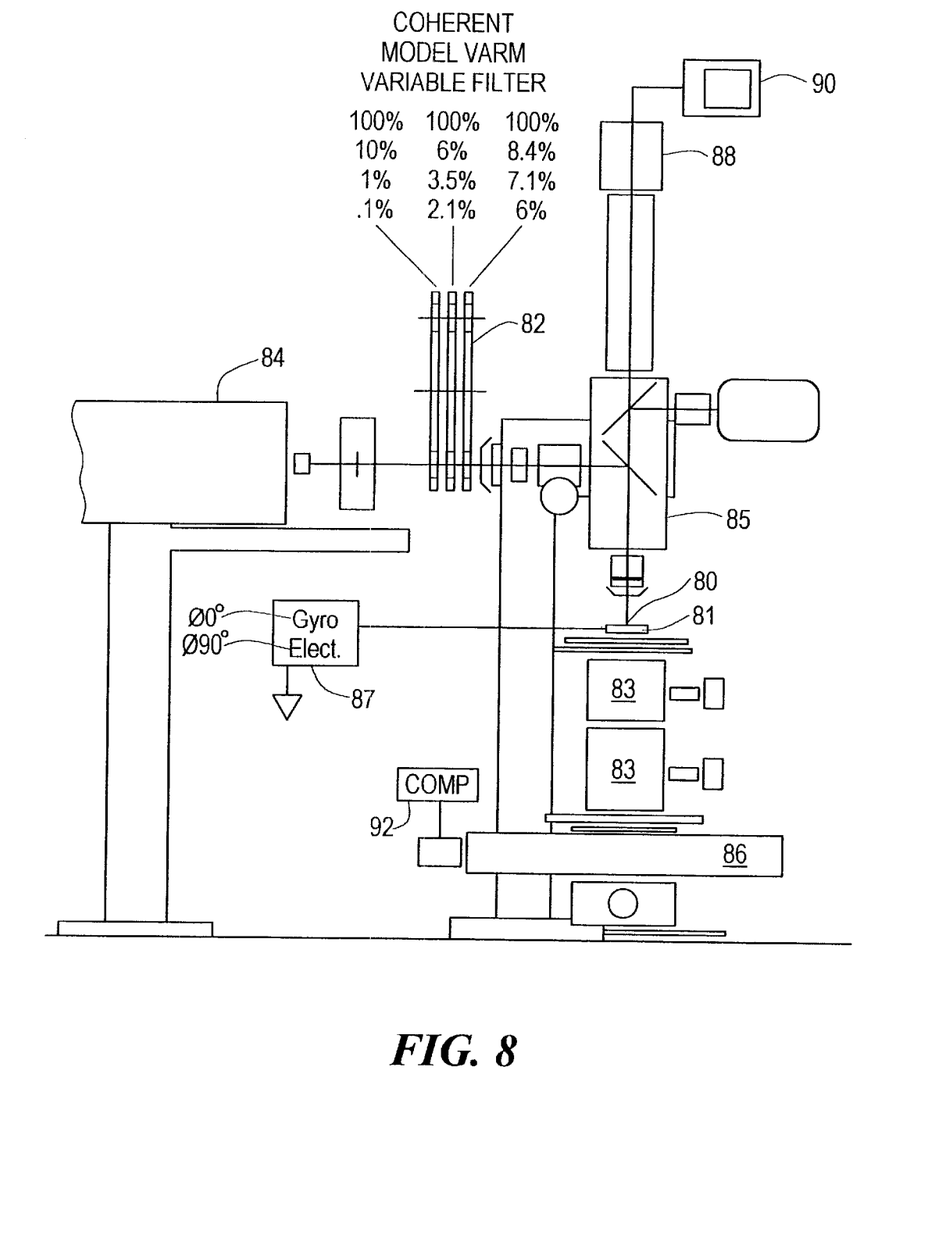
FIG. 8 illustrates equipment for the practice of the deposition or ablation for balancing.

The tuning fork gyro may be encapsulated, each gyro with its own on-chip vacuum cover. The gyro chips can alternatively or additionally be sealed in vacuum packages with transparent covers. Individual gyros can be mounted into packages and inserted into a vacuum chamber or an entire wafer of gyros can be inserted into a vacuum chamber. The gyro as thus provided is placed in a carrier 81 on a table 92 that is positionable by manual positioner 83 or motorized positioner 84.

Gyro electronics [86] 87 operate a gyro [88] in the normal operating condition. The electronics can either be in the vacuum chamber or externally connected through vacuum feed throughs and/or probe cards.

A laser 84, typically a green beam YAG, is positioned to direct a beam through filters 82 and microscope 85 to the gyro and operated to focus a beam of spot size typically smaller than the beam 62 width. It is possible, but more difficult to use only the edge of a larger spot. Controller 86 positions the carrier 81 so that the laser beam is focused upon the edge of the beam 62. The laser intensity is controlled by laser 84 input power, filters 82 and pulse repetition rate so that the beam neatly trims the beam corner. For smooth edges, the pulse rate should be higher than the rate determined by the thermal time constant of the suspension beams. The laser is external to gyro encapsulation so that the beam passes through a glass or quartz cover at 81.

Each proof mass is trimmed separately so that no common mode or differential sense axis motion is permitted. The excitation to both sense plates is grounded to measure quadrature not associated with vertical motion. With excitation to only one proof mass, the gyro and excitation electronics 87 are operated so that the magnitude of quadrature from sense motion is read. The quadrature sensed by the electronics 87 is divided by four and each of the four suspension beams 62 is trimmed to a one quarter value. The trimming is performed on the beam at an appropriate location with the gyro operating and the quadrature monitored as the laser is moved along the beam. Typically less than 25% of the beam length is used for trimming. If necessary, a second pass may be made. The beam motion may be controlled manually but is usually computer assisted or fully automated. The second proof mass is excited and its quadrature is removed. Both proof masses are excited and the differential quadrature measured. If necessary, an additional trim is done on the differential signal.

With visual observation through CCD camera 88 and monitor 90, the beams 22 are aligned to locate the beam edges at the laser beam and to identify start and end points set in computer 92 to control positioner 86 to sweep the beam then along at a set rate, the entire trimming process being highly automated.

The present invention has been described with respect to specific examples. The dynamic adjustment of the gyro as reflected in the following claims is typically realized in a device where the at least some portion of the suspension beams are orthogonal to both the driven and sensed directions. Accordingly, beams as used here and in the claims are not limited to straight beams but can encompass curved beams and beams which fold into zigzag patterns. Additionally the beams are shown supported by intermediate flexures 14, 56. Gyros with beams not so supported are also the subject of and can be used with the invention. Also in typical practice of the invention the beams will be modified at the corner facing the applied radiation.

Deposition can be achieved with equipment conceptually like that of FIG. 8 in which any one of the well know techniques of molecular or atomic deposition in beams or through masks may be used in lieu of the laser beam.

The concepts of ablation or deposition are to be interpreted also to include melting of the support beam material with the resulting change in position accomplishing a dynamic balancing of the gyro.

APPENDIX A

MODEL OF BENDING BEAM WITH CROSS PRODUCTS IF INERTIA

A.1 Rotations to Principal Axes

For a planar area, the rotations about an axis perpendicular to the plane are well defined. Assume a cross section whose area inertias are determined by (because different conventions appear in the literature, all is detailed):

$$I_x = \int_A y^2 da$$

$$I_y = \int_A x^2 da$$

$$I_{xy} = \int_A xy\, da \qquad\qquad (A\text{-}1)$$

In FIG. 2, the cross products of inertia defined in the substrate axes are negative. The principal axes, where $I_{xy}=0$ are rotated an angle $\gamma$ from the substrate axes.

$$\tan 2\gamma = \frac{2I_{xy}}{I_y - I_x} \quad (A-2)$$

For FIG. 2, $I_x > I_y$ so that the rotation to the principal axes is positive as shown. Two pairs of formulae are offered for the principal moments. The principal moments may also be obtained by the general formula for rotation with $\gamma$ defined by (A-2):

$$I_{xp} = I_x \cos^2\gamma + I_y \sin^2\gamma - I_{xy}\sin 2\gamma$$

$$I_{yp} = I_y \cos^2\gamma + I_x \sin^2\gamma + I_{xy}\sin 2\gamma \quad (A-3)$$

The following simplification for the principal inertias is valid when $I_x > I_y$ and $\gamma$ is small.

$$I_{xp} = \frac{1}{2}(I_x + I_y) + \sqrt{\frac{1}{4}(I_x - I_y)^2 + I_{xy}^2} \quad (A-4)$$

$$I_{yp} = \frac{1}{2}(I_x + I_y) - \sqrt{\frac{1}{4}(I_x - I_y)^2 + I_{xy}^2}$$

A.2. Coupling for Simple Beam

Assume that a beam whose principal axes are rotated an angle $\gamma$ from the substrate (drive force axes). What is the displacement or force in the y direction caused by the drive force $F_x$? The force in substrate axes is converted to principal axes. The displacement stiffness calculation is performed in the principal axes and the resulting displacements are transformed back to the substrate axes. The displacements x and y in the substrate frame are proportional to (assuming similar boundary conditions for x and y):

$$\begin{vmatrix} x \\ y \end{vmatrix} \alpha \begin{vmatrix} \cos\gamma & \sin\gamma \\ -\sin\gamma & \cos\gamma \end{vmatrix} \begin{vmatrix} \frac{\cos\gamma}{EI} \\ \frac{\sin\gamma}{EJ} \end{vmatrix} F_x \quad (A-5)$$

where I=inertia that controls x motion (commonly $I_y$)
J=inertia that controls y motion (commonly $I_x$)
E=Young's modulus
Further work on (A-5) yields:

$$\begin{vmatrix} x \\ y \end{vmatrix} \alpha \begin{vmatrix} \frac{\cos^2\gamma}{EI} + \frac{\sin^2\gamma}{EJ} \\ \frac{\sin 2\gamma}{2E}\left(\frac{1}{J} - \frac{1}{I}\right) \end{vmatrix} F_x \quad (A-6)$$

For small rotations $\gamma$, the ratio of displacements y/x which can be used in (2) for calculating rate equivalent quadrature is:

$$\frac{y}{x} = \frac{\sin 2\gamma}{2}\left(\frac{I}{J}\right) \quad (A-7)$$

It is also possible to define a cross stiffness relating y force to x displacement, the relationship used in the design spread sheet. Assume that the x and y stiffness is proportional to EI and EJ, respectively. The cross stiffness is then defined by:

$$k_{xy} = \frac{\sin 2\gamma}{2}(k_x - k_y) \quad (A-8)$$

A.3. Parallelogram Cross Section

For a beam whose cross section is a parallelogram as shown in FIG. A-3, the moments of inertia about the substrate axes are determined by:

$$I_x = \frac{wt^3}{12} \quad (A-9)$$

$$I_y = \frac{wt}{12}(w^2 + a^2)$$

$$I_{xy} = \frac{awt^2}{12} = \frac{at^3}{12}\tan\theta$$

where t=thickness of wafer
w=width of mask opening
$\Theta$=angle of parallelogram-deviation from $\pi/2$
a=offset of top over bottom=t tan $\Theta$ A.4. Deposited Mass Assume a rectangular mass is deposited upon a beam as shown in FIG. A-2. If the mass is small so that the center of gravity of the composite structure is approximately that of the original beam, the cross product of area inertia is approximated by:

$$I_{xy} \approx \frac{w_d t_d (w - w_d)(t + t_d)}{4} \quad (A-10)$$

A.5. Two Section Beam

The beam is modeled by two sections as shown in FIG. 2 so that the effect of depositing mass along only a segment, not the entire length, can be considered. Assuming one end of each beam is built in, the compliance of beam i in its own frame of principal moments is described by:

$$\bar{x}_i = D_i \bar{F}_i \quad (A-11)$$

where the displacement and force vectors and the compliance matrix D are defined by:

$$\begin{vmatrix} x \\ \alpha \\ y \\ \beta \end{vmatrix} = \begin{vmatrix} \frac{L^3}{3EI} & \frac{L^2}{2EI} & 0 & 0 \\ \frac{L^2}{2EI} & \frac{L}{EI} & 0 & 0 \\ 0 & 0 & \frac{L^3}{3EJ} & \frac{L^2}{2EJ} \\ 0 & 0 & \frac{L^2}{2EJ} & \frac{L}{EJ} \end{vmatrix} \begin{vmatrix} F_x \\ M_\alpha \\ F_y \\ M_\beta \end{vmatrix} \quad (A-12)$$

where x,y=horizontal (drive axis) and vertical (sense axis) displacements
$\alpha\beta$=relative rotations of ends of beams caused by bending
L=length of beams
E=Young's modulus
I=principal moment of inertia effecting X motion, called $I_y$ in Appendix A.1 and A.3
J=principal moment of inertia effecting Y motion, called $I_x$ in Appendix A.1 and A.3
Define a geometry matrix L to relate forces and moments applied at the end of beam 1 to the forces and moments applied to beam 1:

$$L = \begin{vmatrix} 1 & 0 & 0 & 0 \\ L_2 & 1 & 0 & 0 \\ 0 & 0 & 1 & 0 \\ 0 & 0 & L_2 & 1 \end{vmatrix} \quad \text{(A-12)}$$

To account for the beam cross products of inertia, the principal axes of beam 2 are rotated from the substrate by the angle $\gamma_2$ about the beam axis; thus, the rotation matrix from substrate to beam 2 coordinates is:

$$C_s^2 = \begin{vmatrix} \cos\gamma_2 & \sin\gamma_2 & 0 & 0 \\ -\sin\gamma_2 & \cos\gamma_2 & 0 & 0 \\ 0 & 0 & \cos\gamma_2 & \sin\gamma_2 \\ 0 & 0 & -\sin\gamma_2 & \cos\gamma_2 \end{vmatrix} \quad \text{(A-13)}$$

The rotation of beam 1 principal axes defined by the angle $\gamma_1$, taken with respect to beam 2; thus, the rotation matrix from substrate to beam 1 coordinates is:

$$C_s^1 = \begin{vmatrix} \cos\gamma_1 + \gamma_2 & \sin\gamma_1 + \gamma_2 & 0 & 0 \\ -\sin\gamma_1 + \gamma_2 & \cos\gamma_1 + \gamma_2 & 0 & 0 \\ 0 & 0 & \cos\gamma_1 + \gamma_2 & \sin\gamma_1 + \gamma_2 \\ 0 & 0 & -\sin\gamma_1 + \gamma_2 & \cos\gamma_1 + \gamma_2 \end{vmatrix} \quad \text{(A-14)}$$

Equation (A-11) is valid for an individual beam i. Considering both beams, force and moments at the right end are related to displacements at the right end through:

$$\begin{vmatrix} x \\ \alpha \\ y \\ \beta \end{vmatrix} = \left[ (C_s^2)^T D_2 C_s^2 + L^T (C_s^1)^T D_1 C_s^1 L \right] \begin{vmatrix} F_x \\ M_\alpha \\ F_y \\ M_\beta \end{vmatrix} \quad \text{(A-15)}$$

The matrix D represents the compliance between the forces and displacements of (A-15). Equation (A-15) indicates the translations and rotations which are obtained in response to force and torque applied to the free end of a built-in beam. For the gyroscope problem, the beam acts as though both ends were built in because of symmetry of the opposing beams attached to the proof mass. Rearrange (A-15);

$$\begin{vmatrix} 1 & -D_{12} & 0 & -D_{14} \\ 0 & -D_{22} & 0 & -D_{24} \\ 0 & -D_{32} & 1 & -D_{34} \\ 0 & -D_{42} & 0 & -D_{44} \end{vmatrix} \begin{vmatrix} x \\ M_\alpha \\ y \\ M_\beta \end{vmatrix} = \begin{vmatrix} D_{11} & 0 & D_{13} & 0 \\ D_{21} & -1 & D_{23} & 0 \\ D_{31} & 0 & D_{33} & 0 \\ D_{41} & 0 & D_{43} & -1 \end{vmatrix} \begin{vmatrix} F_x \\ \alpha \\ F_y \\ \beta \end{vmatrix} \quad \text{(A-16)}$$

For the gyro coupling, $$\alpha = \beta = F_y = 0$$

(A-16) can be inverted to obtain the translations. The matrix manipulations have been coded.

APPENDIX B

MODEL FOR X AND Y MASS UNBALANCE SINGLE MASS EFFECT

Figure 4:
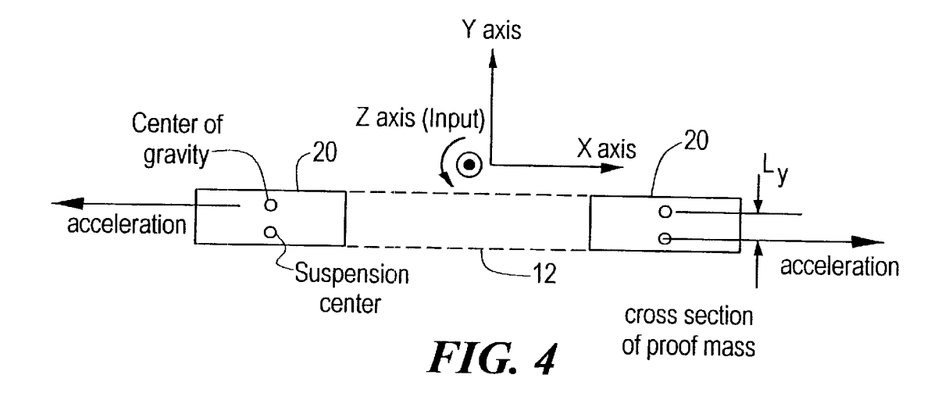
FIGS. 4 and 5 illustrate mass rebalance effects leading to smaller quadrature bias effects.

Consider the motion of one proof mass as shown in FIG. 4. The centers of suspension and gravity are separated by $L_x$ and $L_y$. The motion is assumed to be in the plane so that translations x and y of the center of suspension and rotation $\Theta$ determine the position of the proof mass with respect to the substrate. Neglecting damping and stiffness cross coupling, the motion of the proof mass is described by:

$$ms^2(x - l_y\theta) + c_x sx + k_x x = F_x \quad \text{(B-1)}$$

$$ms^2(y + l_x\theta) + c_y sy + k_y y = F_y \quad \text{(B-2)}$$

$$Is^2\theta + c_\theta s\theta = -k_x\theta - k_x l_y x + k_y l_x y \quad \text{(B-3)}$$

where m=proof mass
   l=proof moment of inertia about CG
   c=damping constant
   k=spring stiffness
   F=force
   s=Laplace transform of d/dt
   $l_x$, $l_y$=displacements, of center of gravity from center of suspension (FIG. B-1)

If the coupling represented by $l_y$ is small the drive displacement is determined by (B-1) so that x becomes an input to (B-2) and (B-3), which are solved simultaneously to yield the matrix expression:

$$\begin{vmatrix} y \\ \theta \end{vmatrix} = \frac{\begin{vmatrix} Is^2 + C_\theta s + k_\theta & -ms^2 l_x \\ k_y l_x & ms^2 + C_y s + k_y \end{vmatrix} \begin{vmatrix} F_y \\ -k_x l_y x \end{vmatrix}}{(Is^2 + C_\theta s + k_\theta)(ms^2 + C_y s + k_y)} \quad \text{(B-4)}$$

From the first row of (B-4), the indicated rate error is obtained by ($\hat{\Omega} = F_y/2mV_D$) equating the Coriolis terms to extraneous y forces and noting that $s = j\omega_D$:

$$\hat{\Omega} = \frac{l_x l_y k_x \omega_D}{2 k_\theta} \quad \text{(B-5)}$$

In deriving (B-5), considerations of sharp resonances and modal frequencies lead to the simplification that $Is^2 + C_\theta + k_\theta \approx k_\theta$.

APPENDIX C

MODEL FOR Y MASS UNBALANCE—TWO-MASS EFFECT

Figure 5:
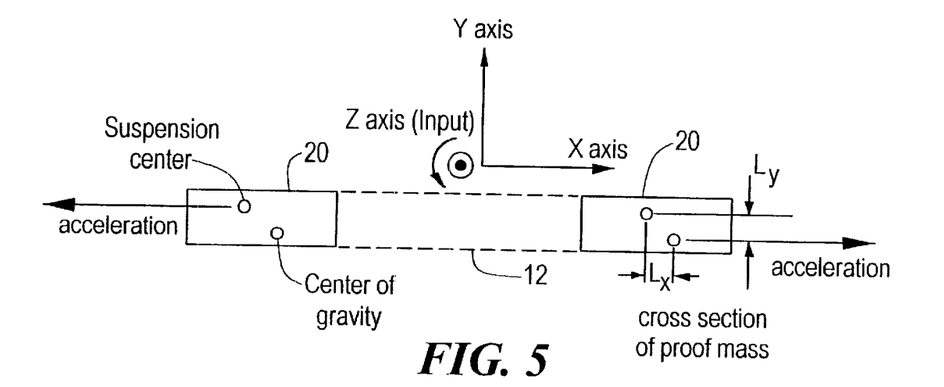

A vertical unbalance is defined as the separation of the center of suspension from the center of gravity along the y (vertical axis). If one proof mass has the CG above the center of suspension and the other has the CG below, a couple results which twists the entire gimbal about the input/output axis as shown in FIG. 4. The resulting quadrature term is approximately:

$$\hat{\Omega} = \frac{\omega_D l_y}{2 r_m \left(1 + \frac{k_1}{k_y \gamma_m^2}\right)} \quad \text{(C-3)}$$

where $\omega_D$=resonant frequency of drive axis
   $l_y$=displacement of CG from suspension center along y axis
   $r_m$=distance of proof mass CG from torsion bar rotation axis (torsion bars connect the base region to the substrate)
   $k_1$=rotational stiffness of torsion bars
   $k_y$=vertical stiffness of beams connecting torsion bar to proof mass Assuming that $l_y$ is 0.1% the beam thickness results in quadrature terms of $1.4\times10^{5}$°/hr. The 0.1% figure is consistent with observations of the beam cross sections; however, if the proof mass is curled larger separations of the centers of suspension and gravity are possible. To balance quadrature of 50 rad/s requires deposition of 10% of the total proof mass.

Where the entire frame 12 is twisted in FIG. 4, a twisting of the proof mass about its own axis as in FIG. 5 from a separation of centers of gravity and suspension, the opposing drive accelerations will result in opposing torques on the proof masses so that the frame does not rotate. Assume that the center of gravity is the center of the signal read on the sense axis. For drive frequency lower than the proof translation, the acceleration shown will cause of the CG of the right proof mass to fall while that of the right will rise; thus, a quadrature bias results. With $l_x=0.001\ l_m$ (proof mass length) and $l_y=0.001\ w_m$ (proof mass width), the resulting quadrature bias is 2000°/hr, much smaller than that of the frame.

What is claimed is:

1. A process for balancing a tuning fork gyroscope comprising the steps of:

providing a tuning fork gyroscope having a proof mass and at least one support beam therefor and further having a quadrature bias reflecting unbalance in the dynamics of motion of the gyroscope proof mass and support beam;

modifying at least one said support beam extending between a proof mass and a frame to reduce the quadrature bias.

2. The process of claim 1 wherein said modifying step includes the step of modifying support beam on one side of the support beam.

3. The process of claim 2 wherein said modifying step includes the step of applying a deposition to said at least one beam.

4. The process of claim 2 wherein said modifying step includes the step of ablating said beam.

5. The process of claim 1 wherein said modifying step includes the step of ablating said beam.

6. The process of claim 5 wherein said ablating step includes the step of applying laser radiation to the beam.

7. The process of claim 5 wherein said gyroscope providing step includes the step of providing the gyroscope in a sealed package with a laser penetrable window exposing said beam to the laser radiation.

8. The process of claim 5 wherein:

said providing step includes operating said gyroscope in a normal condition;

said modifying step further includes applying laser radiation during operation of said gyroscope.

9. The process of claim 1 wherein said modifying step includes the step of applying a deposition to said at least one beam.

10. The process of claim 1 wherein said modifying step includes the step of modifying the beam during operation of the gyroscope.

11. The process of claim 10 wherein said modifying occurs on said beam near said frame.

12. The process of claim 1 wherein said modifying step includes melting a portion of said beam.

13. The process of claim 1 wherein said modifying step includes the step of applying radiation to said beam with a repetition rate higher than a thermal time constant of said beam thereby to obtain smoothness in a modified region of said beam.

14. The process of claim 1 wherein said modifying step includes the step of applying a green laser beam from a YAG laser to said support beam.

15. A tuning fork gyroscope made according to the process of any one of claim 1.

16. Apparatus for dynamically balancing a tuning fork gyroscope comprising:

means for energizing a tuning fork gyroscope;

a support for an inertial element of said gyroscope;

a laser beam source;

an optical path directing radiation from said laser beam source to a region of said support which is adapted for supporting one said inertial element;

said optical path including a viewer allowing operator viewing of a point of incidence of laser radiation from said laser beam source; and a positioner for moving said support relative to the region of directed radiation.

17. The apparatus of claim 16 wherein said laser beam source includes a YAG laser.

* * * * *

UNITED STATES PATENT AND TRADEMARK OFFICE
CERTIFICATE OF CORRECTION

PATENT NO. : 6,571,630 B1
APPLICATION NO. : 09/937268
DATED : June 3, 2003
INVENTOR(S) : Marc S. Weinberg et al.

It is certified that error appears in the above-identified patent and that said Letters Patent is hereby corrected as shown below:

Column 4, line 22, "107 $_d$ = drive axis" should read -- $\omega_d$ = drive axis--;

Column 4, line 23, "107 $_s$ = sense axis" should read -- $\omega_s$ = sense axis--;

Column 5, line 57, "Gyro electronics [86] 87 operate a gyro [88] in the normal" should read --Gyro electronics 87 operate a gyro in the normal--;

Column 6, lines 63-67, equation (A-1), $$"I_x = \int_A y^2 \, da$$
$$I_y = \int_A x^2 \, da$$
$$I_{xy} = \int_A xy \, da"$$

should read $$-- I_x = \int_A y^2 \, dA$$
$$I_y = \int_A x^2 \, dA$$
$$I_{xy} = \int_A xy \, dA -- \text{ and}$$

Column 8, line 22, "bottom = $\tau$ tan" should read --bottom = t tan--.

Signed and Sealed this

Twenty-eighth Day of November, 2006

JON W. DUDAS
*Director of the United States Patent and Trademark Office*